3,176,056
METHOD OF FORMING AND RAPID FIRING PERICLASE PELLETS

James C. Hicks, Los Altos, Roger H. Cook, San Jose, and Lloyd M. Housh, Santa Clara, Calif., assignors to Kaiser Aluminum & Chemical Corporation, Oakland, Calif., a corporation of Delaware
No Drawing. Filed Aug. 14, 1961, Ser. No. 131,121
6 Claims. (Cl. 264—66)

This invention relates to the production of densified refractory grain material; and more particularly it relates to the production of high purity dense refractory material.

It is desirable to use high density refractory material in various furnace installations in order to ensure longer life of refractory linings in such installations, and better performance, in particular by preventing penetation of metal or slags into and through the linings and other undesirable effects. For instance, chemical attack and consequent destrucition of such linings is minimized or prevented, whether such attack be by furnace gases, dusts, metals or slags. Also, the higher density products have exhibited greater strengths.

In the past, higher densities of magnesia or periclase grains have been secured at the cost of purity of the grain product, or by more expensive methods of heat treatment. On the one hand, fluxes of lower melting points or other extraneous, i.e. non-magnesia, modifiers have been added to the starting magnesium compound, e.g. Mg hydroxide or carbonate, prior to or during the firing stage, to cause better re-crystallization or to accelerate crystal growth and this has been found to produce higher densities. On the other hand, if extraneous or exotic additives are avoided, it has been necessary to fire at very high temperatures, such as are found in shaft kilns, with rather limited daily production; or a two-stage firing has been practiced, whereby the starting magnesium compound is first fired to an active state, then pressed into compact shapes and finally deadburned. The densities of periclase produced by the latter process, of firing without extraneous additives, have still not been as high as desired.

According to the present invention, it has now been discovered that the density of high purity periclase or deadburned magnesia is markedly improved by heating magnesia at a very rapid rate from an intermediate burning temperature, i.e. at which incipient re-crystallization occurs, up to deadburning temperatures. For instance, substantially increased density is obtained by heating through such range at a rate of temperature increase of at least 10° C. per second.

The magnesia starting materials employed are preferably such compounds as will form high purity periclase containing on the ignited basis at least 95% MgO and not over 5.0% impurities. Magnesium compounds benefited by the present invention are those which are in finely divided state, such as magnesium hydroxide or carbonate, particularly such as are obtained by precipitation from magnesium salt solutions including seawater, brines, bitterns and the like, by methods well known in the art. It has been difficult in the past to form dense agglomerates of periclase crystals from such material. However, it has now been found by the present invention that dense, high purity periclase grain or agglomerate is obtained from such precipitated compounds in one mode of operation by heating to form active magnesia, then forming into compacted shapes under pressure, and heating such shapes at a rate of at least 10° C. per second, preferably 100° C. per second, from a temperature of about 1000° C. to deadburning temperature, such as at least about 1600° C., but without general fusion.

In heating to form periclase by the present invention, the magnesia material can be slowly heated up to intermediate burning temperatures, such as 1000° C. However, the rate of heating is accelerated in the zone from 1000° C. to deadburning temperature.

In burning magnesium hydroxide to form periclase according to methods now known and used in this art, for example, a precipitated and dewatered sludge of magnesium hydroxide is fed into a rotary kiln at about 25° C. (sludge) temperature. As it passes down through the kiln the bed temperature is increased to about 1200° C. in about 100 minutes. At this point, the magnesium hydroxide will have been converted to an active or light burn magnesia and will be entering the burning zone. In the burning zone the temperature of the material increases from about 1200° C. to about 1700° C. or higher and this increase requires from 20 to 30 minutes. In other words, the rate of increase of temperature is from about 15° C. to 30° C. per minute. In some kilns, operated at specially high temperatures, the bed temperature may be as high as 1850° C. and in such instance, the rate of increase of temperature in the burning zone, or deadburning zone, i.e. between about 1000° C. and 1850° C., is below 50° C. per minute or less than 1° C. per second.

The rate of increase of temperature in the range of from 1000° C. to 1900° C., according to the present invention is very rapid, on the other hand, and preferably is at least 100° C. per second. The porosity of the final periclase product has been found to be reduced about 25% below that of periclase made by the conventional, slower heating method, or in other words, the density is substantially increased.

Example

An amount of magnesium hydroxide recovered by precipitation from seawater by reaction with calcined dolomite by the method of Vettel et al., U.S. 2,595,314, May 6, 1952, contains on the ignited basis 2.1% $SiO_2$, 1.1% $R_2O_3$ (including $Fe_2O_3$, $Al_2O_3$, $B_2O_3$), 1.3% CaO and 95.5% MgO by difference. It is calcined at 1000° C. for one hour and the magnesia is ground to pass a 35 mesh (Tyler) screen. The ground material is admixed with sufficient chromic acid in aqueous solution to provide 0.25% $Cr_2O_3$ on the fired basis based on the total weight of the mass, and is formed into pellets using a forming pressure of 10,000 p.s.i. The pellets obtained are cylinders ½ inch in diameter and ½ inch in height.

One portion, A, of these pellets is placed in an alumina boat upon a setter of the same composition as the pellets, resting on a layer of high purity magnesia powder and is heated from 25° C. to about 1200° C. during a period of 100 minutes. The pellets are then heated from 1200° C. to 1670° C. during a period of twenty minutes and are held at the 1670° C. temperature for one hour. The fired pellets are rapidly cooled to room temperature and porosity of the material is determined by immersing a weighted pellet in kerosene according to the method well-known in this art and described in "Ceramic Tests and Calculations," A. I. Andrews, published by John Wiley & Sons, 1928. By such test, the porosity of these pellets averages 9.6% by volume.

Another portion, B, of the above pellets are treated in exactly the same manner except that the pellets disposed on the alumina boat are heated from 25° C. to 1200° C. over a period of 100 minutes and are heated in a gradient furnace from 1200° C. to 1670° C. in from 3 to 5 seconds and are then held at 1670° C. for one hour. The porosity is determined in the same manner and is found to be 7.3% by volume. The gradient furnace is an electrically heated furnace having a temperature of about 1100° C. at one end and of about 1670° C. at the other end. The boat is drawn through this furnace from the cooler to the hotter end and then withdrawn after soaking at the highest temperature for one hour.

In still other tests, a finely divided magnesite from natural sources and containing about 99% magnesium carbonate, was calcined at 1000° C. to form active magnesia, formed into pellets under 1000 p.s.i. pressure, and divided into two batches. One batch was heated to 1800° C. under the usual firing schedule, i.e., by increasing to firing temperature at a rate of about 20° C. per min., and one batch was heated by dropping into a furnace at 1800° C. in such manner that the temperatures of the pellets increased at a rate of about 150° C. per second. The porosities of the rapidly heated pellets were substantially lower than those of the conventionally heated pellets.

The rapid increase in temperature can alternatively be produced in a flame fired furnace by increasing the flame temperature, for example, by introducing preheated air to support combustion or by using oxygen to support combustion. Other types of furnaces, e.g., rotary kilns, can be employed to effect firing, so long as rapid increase of temperature is effected in the burning or firing or recrystallization zone, and especially with increase of flame temperature as described above.

The mechanism of the action is not understood and it may be that liquids are formed which cause the periclase crystals to coalesce into dense granular material, or it may be that crystal growth is facilitated. Whatever the reason or mechanism, the effect of the process of the invention is a reduction in the grain porosity and a corresponding increase in density. Finely divided, high purity magnesia from other sources than the hydroxide is improved in density by treatment according to the present process, with or without the incorporation of a crystallization promoter such as chromic acid. Alternatively to firing in two stages as described in the specific example above, the material can be fired in a single firing operation effecting accelerated heating in the firing zone, that is, e.g., magnesium hydroxide can be fired directly to periclase in this manner.

Screen sizes shown herein are Tyler screen sizes as shown in Chemical Engineers' Handbook, John H. Perry, Editor-in-Chief, Second edition, published by McGraw-Hill Book Company, 1941, page 1718. The chemical analysis are reported as the simple oxides, in the manner usual in this art, although the substances, e.g., $SiO_2$, may actually be present in combination with one of the other components, e.g., CaO. Percentages are by weight unless otherwise indicated.

Having now described the invention, what is claimed is:

1. Method of preparing dense, high purity periclase refractory grain material which comprises calcining a finely divided magnesium compound to form magnesia, then firing said magnesia at a temperature increasing from about 1000° C. to about 1900° C. at a heating rate of at least 10° C. per second.

2. Method of preparing dense, high purity periclase grain material which comprises calcining precipitated, finely divided magnesium hydroxide at up to about 1000° C. to form caustic magnesia, forming said magnesia into shapes under pressure, and firing said shapes at a temperature increasing from about 1000° C. to deadburning temperature at a heating rate of at least 100° C. per second.

3. Method of preparing dense, high purity periclase grain material which comprises calcining precipitated, finely divided magnesium hydroxide at up to about 1000° C. to form caustic magnesia, forming said magnesia into pellets under high pressure, firing said pellets at a temperature increasing from about 1200° C. to about 1670° C. at a heating rate of at least 100° C. per second, maintaining said pellets at 1670° C. for about one hour, and cooling to recover high density periclase.

4. In the method of preparing high purity, dense periclase grain the step which comprises heating magnesia from about 1000° C. up to deadburning temperature at a heating rate of at least 10° C. per second.

5. Method as in claim 4 wherein said magnesia is heated at a rate of at least 100° C. per second.

6. Method as in claim 4 wherein said magnesia is heated from about 1200° C. to at least 1600° C.

References Cited in the file of this patent

UNITED STATES PATENTS

| | | |
|---|---|---|
| 2,579,886 | Vettel | Dec. 25, 1951 |
| 2,940,154 | Howard | June 14, 1960 |
| 2,971,240 | Renkey | Feb. 14, 1961 |